March 8, 1966          J. C. NYGARD          3,239,682

NON-LINEAR INDUCTANCE

Filed Dec. 24, 1958

United States Patent Office 3,239,682
Patented Mar. 8, 1966

3,239,682
NON-LINEAR INDUCTANCE
John C. Nygard, 59 Outlook Drive, Lexington, Mass.
Filed Dec. 24, 1958, Ser. No. 782,708
5 Claims. (Cl. 307—106)

This invention relates to pulse-forming networks and in particular to the use of a non-linear inductance in the charging circuit for a pulse-forming network. In general, a pulse-forming network is a circuit to which a steady D.C. voltage is applied, as a result of which charge is stored in the pulse-forming network. When a switch is turned, the charge accumulated in the pulse-forming network is released, and as a result of the character of the network the rate at which the charge is released is controlled so as to give the desired wave form. In general, it is a square wave which is desired. One method of charging the pulse-forming network makes use of resonance phenomena and is known as resonance charging. The pulse-forming network itself forms a circuit comprising inductances and capacitances and the D.C. voltage is applied thereto through an inductance which is so related to the circuit characteristics of the pulse-forming network that when the D.C. voltage is first applied to the pulse-forming network the charging current operates at resonance so that the voltage swings to twice the voltage of the D.C. power source. In series with this inductance there is usually provided an appropriate tube to act as a valve; that is to say, it does not permit the D.C. source to provide current to the pulse-forming network until the latter has been fully discharged. In general, the inductance through which the D.C. voltage source charges the pulse-forming network is linear; that is to say, its inductance remains constant regardless of the current flowing therethrough, and the magnetic flux therein increases linearly with increase in current. It will be apparent that as soon as the pulse-forming network is fully discharged the valve tube will act to initiate the charging from the D.C. voltage source, and frequently the result is that the pulse-forming network will start to be charged before the thyratron switch mechanism has returned to the necessary original state. In accordance with the invention, a non-linear characteristic is introduced into the inductance through which a D.C. voltage is applied to the pulse-forming network. The action of this non-linear characteristic is to delay the charging of the pulse-forming network so that the thyratron switch may operate properly and be fully restored to its quiescent state before charging takes place.

The invention may best be understood from the following detailed description thereof having reference to the accompanying drawing in which FIG. 1 is a circuit diagram illustrating a pulse-forming network together with its associated charging circuit;

Figure 1:
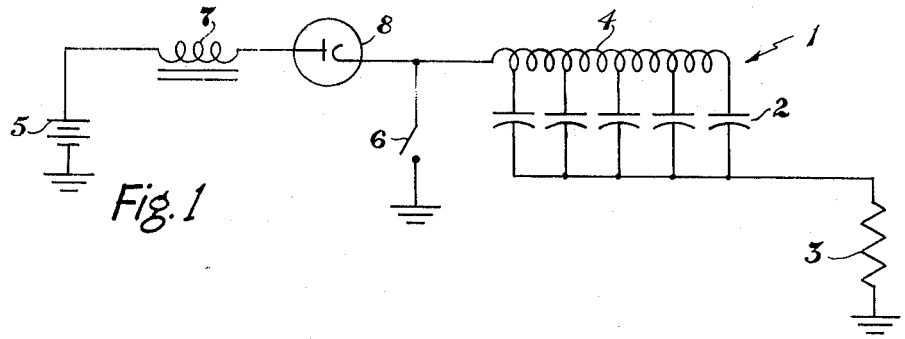
Figure 2:
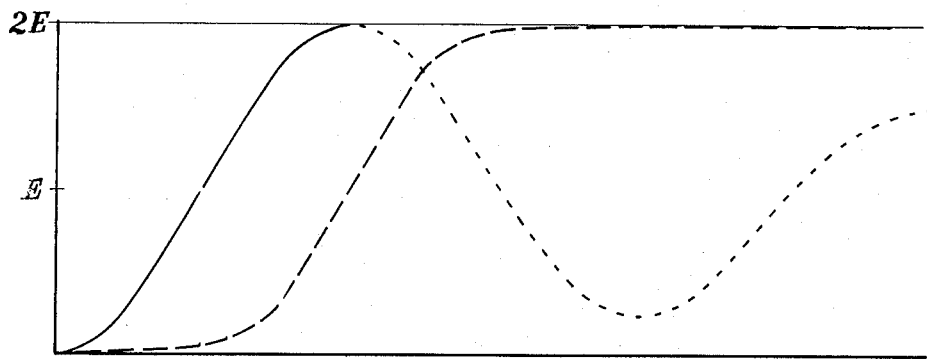
FIG. 2 is a graph illustrating the voltage in the purse-forming network as a function of time during the charging operation.

Referring to the drawing and first to FIG. 1 thereof, a pulse-forming network 1 generally comprises a series of capacitors 2 arranged in parallel between the load 3 and various points on an inductance 4. This pulse-forming network 1 is charged by applying a D.C. potential from a D.C. voltage source 5 to the high voltage end of the network. That is to say, the high voltage is applied to the inductance 4 so that all the capacitors 2 become charged. A thyratron switch 6 is connected between this high voltage end of the pulse-forming network 1 and ground, so that when the thyratron 6 is triggered the high voltage end of the pulse-forming network 1 becomes grounded and the capacitors 2 discharge through the inductance 4, thus providing for example, a square-wave current pulse through the load 3. In accordance with the principles of resonance charging, the D.C. voltage is applied to the pulse-forming network through an inductance 7 and a diode valve or rectifier 8. When the pulse-forming network 1 has completed being discharged, current flows from the D.C. source 5 through the inductance 7 and through the diode 8 back into the condensers 2 of the pulse-forming network 1. However, because the device operates at resonance the current flow does not stop when the capacitors 2 are charged to the voltage of the D.C. source 5, but because of the inductance 7 in the charging circuit, this current continues to flow and so the voltage across the capacitors 2 reaches a value twice that of the D.C. voltage source 5. This is shown by the solid line in the graph of FIG. 2. If it were not for the presence of the diode 8 the voltage across the capacitors 2 would continue to oscillate in the manner shown by the dotted line about the value of the D.C. voltage source 5 until the situation finally stabilizes with the voltage across the capacitors 2 being equal to that of the voltage source 5. However, as a result of the presence of the diode 8 the capacitors 2 are not permitted to discharge on the reverse half cycle and therefore are maintained at the highest voltage they originally reached.

Figure 3:
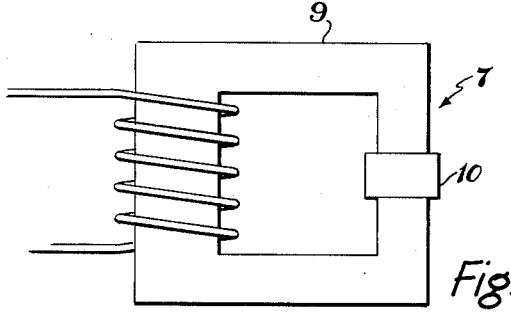
FIG. 3 is a diagram illustrating one embodiment of the invention.

In accordance with the invention a non-linearity is introduced into the inductance 7 as shown in FIG. 3. For example, said inductance 7 may comprise an iron core 9 including as a part of its magnetic circuit a saturable material 10, such as ferrite or some similar product. As a result, at low currents the iron core 9 has a high inductance, but as higher currents are reached, so that the ferrite or other material saturates, the iron core acts as through it had an air gap in it, since the ferrite is no longer acting as part of the low-reluctance magnetic circuit. The inductance at these higher-current values would then be inversely proportional to the length of the high-reluctance "gap." The effect of providing such a saturable material in the iron core 9 of the inductance 7 is shown by the broken line in the graph of FIG. 2. At first the inductance in the iron core 9 is relatively high, thereby opposing the flow of current so that the current remains low. However, when the saturable material 10 becomes saturated, the inductance is decreased by an amount which is proportional to the thickness of the saturable material 10. As a result of this reduction in inductance, the current flow is permitted to increase in the normal manner. The overall effect of the addition of the non-linear inductance is to delay the charging of the pulse-forming network 1, thereby permitting the thyratron switch 6 to return to its stable state.

Figure 4:
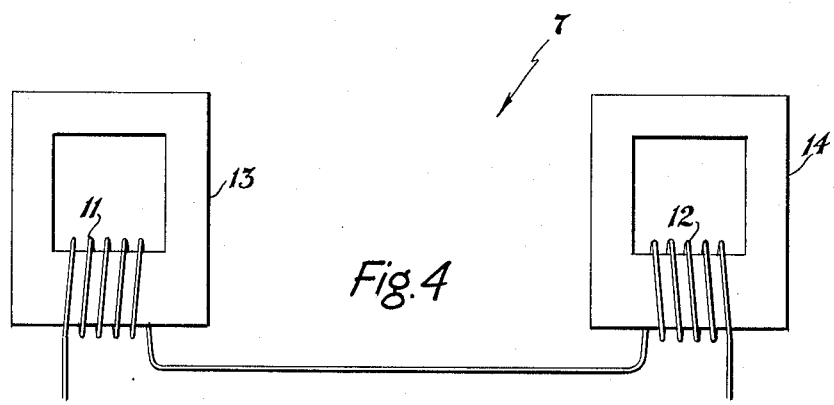
FIG. 4 is a diagram illustrating another embodiment of the invention.

An alternative embodiment of the invention is shown in FIG. 4. In accordance with this embodiment the inductance 7 comprises two coils 11, 12 connected in series each having its own core 13, 14, respectively. However, one core 13 reaches saturation at an early point in the cycle while the other does not. This arrangement has the same effect as that shown in FIG. 3.

Having thus described the principles of the invention together with illustrative embodiments thereof, it is to be understood that although specific terms are employed they are used in a generic and descriptive sense and not for purposes of limitation, the scope of the invention being set forth in the following claims.

I claim:

1. A charging circuit for a pulse-forming network, comprising, in combination with a pulse-forming network: a source of D.C. voltage and an inductor linking magnetic material comprising two components which saturate at mutually different applied magnetomotive forces connected in series between said D.C. voltage and said pulse-forming network, the inductance of said inductor having a non-linearity such that said inductance is less at currents approximating the maximum current delivered to the pulse-forming network during the charging operation than at lower currents delivered to the pulse-forming network during the charging operation.

2. A charging circuit in accordance with claim 1, wherein said inductance comprises a conductive path linking a magnetic core a part of which saturates at a lower current in said conductive path than the maximum current delivered to the pulse-forming network during the charging operation.

3. A charging circuit in accordance with claim 1, wherein said inductance comprises a conductive path linking a single magnetic circuit a part of which saturates at a lower current in said conductive path than the maximum current delivered to the pulse-forming network during the charging operation.

4. A charging circuit in accordance with claim 1, wherein said inductance comprises a conductive path linking a plurality of magnetic cores, at least one of which saturates at a lower current in said conductive path than the maximum current delivered to the pulse-forming network during the charging operation.

5. A charging circuit for a pulse-forming network, comprising in combination with a pulse-forming network: a source of D.C. voltage and an inductor linking magnetic material comprising two components which saturate at mutually different applied magnetomotive forces and a diode connected in series between said D.C. voltage and said pulse-forming network in such a way as to provide resonance charging of said pulse-forming network, the inductance of said inductor having a non-linearity such that said inductance is less at currents approximating the maximum current delivered to the pulse-forming network during the charging operation than at lower currents delivered to the pulse-forming network during the charging operation.

References Cited by the Examiner
UNITED STATES PATENTS

| | | | |
|---|---|---|---|
| 2,400,559 | 5/1946 | Majlinger et al. | 336—178 X |
| 2,451,496 | 10/1948 | Klemperer | 307—108 X |
| 2,459,809 | 1/1949 | Gorham et al. | 307—108 X |

OTHER REFERENCES

"Pulse Generators," vol. 5, Radiation Laboratory Series, page 341 and pages 364, 365 and 366.

LLOYD McCOLLUM, *Primary Examiner.*

MILTON O. HIRSHFIELD, ORIS L. RADER,
*Examiners.*